(12) United States Patent
Ko

(10) Patent No.: US 9,976,866 B2
(45) Date of Patent: *May 22, 2018

(54) ELECTRONIC APPARATUS, CONTROL METHOD THEREOF, COMPUTER PROGRAM, AND COMPUTER-READABLE RECORDING MEDIUM

(71) Applicant: THINKWARE CORPORATION, Seongnam-si, Gyeonggi-do (KR)

(72) Inventor: Suk Pil Ko, Seongnam-si (KR)

(73) Assignee: THINKWARE CORPORATION, Seongnam-si, Gyeonggi-do (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/588,221

(22) Filed: May 5, 2017

(65) Prior Publication Data

US 2017/0241795 A1    Aug. 24, 2017

Related U.S. Application Data

(63) Continuation of application No. 14/955,793, filed on Dec. 1, 2015, now Pat. No. 9,677,899.

(30) Foreign Application Priority Data

Dec. 1, 2014   (KR) .................. 10-2014-0170047
Mar. 16, 2015  (KR) .................. 10-2015-0035743

(51) Int. Cl.
*G01C 21/36*   (2006.01)
*G06T 7/70*    (2017.01)
*G06T 19/00*   (2011.01)

(52) U.S. Cl.
CPC ...... *G01C 21/3635* (2013.01); *G01C 21/3602* (2013.01); *G01C 21/3647* (2013.01); *G06T 7/70* (2017.01); *G06T 19/006* (2013.01); *G06T 2207/30252* (2013.01)

(58) Field of Classification Search
CPC ............ G01C 21/3635; G01C 21/3647; G01C 21/3602; G06T 19/006; G06T 7/70; G06T 2207/30252
See application file for complete search history.

(56) References Cited

U.S. PATENT DOCUMENTS

2011/0052042 A1 * 3/2011 Ben Tzvi .............. G06T 19/006 382/154
2011/0181711 A1 * 7/2011 Reid ..................... G06L 19/006 348/121

* cited by examiner

*Primary Examiner* — Yuen H Wong
(74) *Attorney, Agent, or Firm* — Novick, Kim & Lee, PLLC; Sang Ho Lee

(57) ABSTRACT

Provided herein is a control method of an electronic apparatus. The control method of an electronic apparatus includes: determining a position of a vehicle that is being operated; determining a terrain height in a region positioned within a predetermined distance from the determined position of the vehicle; comparing a terrain height at the position of the vehicle and the terrain height in the region with each other to calculate a terrain height difference; and generating an information object including guidance information of the vehicle and displaying the generated information object through augmented reality by reflecting the terrain height difference.

13 Claims, 17 Drawing Sheets

$$s\begin{bmatrix}x\\y\\1\end{bmatrix} = \begin{bmatrix}f_x & skew\_cf_x & c_x\\0 & f_y & c_y\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix}$$

603  602  601  605

901

902

ELECTRONIC APPARATUS, CONTROL METHOD THEREOF, COMPUTER PROGRAM, AND COMPUTER-READABLE RECORDING MEDIUM

CROSS-REFERENCE TO RELATED APPLICATION

This application is a continuation of U.S. nonprovisional application Ser. No. 14/955,793 filed on Dec. 1, 2015, which claims the priority of Korean Patent Application Nos. 10-2014-0170047, filed on Dec. 1, 2014, and 10-2015-0035743, filed on Mar. 16, 2015, with the Korean Intellectual Property Office, the disclosures of which are incorporated herein by reference.

BACKGROUND OF THE INVENTION

1. Field of the Invention

The present invention relates to an electronic apparatus, a control method thereof, a computer program, and a computer-readable recording medium, and more particularly, to an electronic apparatus capable of performing driving related guidance on a user on augmented reality, a control method thereof, a computer program, and a computer-readable recording medium.

2. Description of the Related Art

In accordance with the development of an electronic technology, various kinds of electronic apparatuses have been developed and spread. Particularly, recently, a technology of providing geographic information in a form of augmented reality (AR) in which additional information such as computer graphics (CG), a text, or the like, is synthesized to a photographed image photographed in real time and is then displayed has been introduced.

According to the augmented reality technology described above, since virtual objects (for example, a graphic element indicating a point of interest (POI), a graphic element indicating a route up to a destination, and the like) may be visually overlapped with and provided on a screen including a real world actually viewed by a user, the geographic information may be provided to the user by a more intuitive method.

Therefore, a navigation terminal according to the prior art could apply the augmented reality technology to synthesize representation information related to a map data to an image obtained by photographing the front of a vehicle that is being driven, thereby performing route guidance.

However, according to the augmented reality technology according to the prior art, it was difficult to express information while absorbing portions in which a height difference on an actual terrain is generated.

As an example, in the augmented reality technology according to the prior art, an object has been expressed in a state in which it is assumed that the vehicle is put on a horizontal line without considering a height of the terrain or information on a height difference has been provided through only a separate image.

However, since the augmented reality technology is a technology of representing an object or providing information in a form similar to an actual form in a screen by intersecting a photographed image input in real time from a camera and a virtual object with each other, in the case in which a position or information of the virtual object is different, a value as augmented reality is significantly decreased.

SUMMARY

An object of the present invention is to provide an electronic apparatus capable of displaying a guidance object through augmented reality by comparing a terrain height at a position of a vehicle and a terrain height in a region positioned within a predetermined distance from the position of the vehicle with each other to calculate a terrain height difference and reflecting the terrain height difference, a control method thereof, a computer program, and a computer-readable recording medium.

Another object of the present invention is to provide an electronic apparatus capable of displaying a guidance object through augmented reality by reflecting a vertical rotation angle of a camera installed in a vehicle as well as the terrain height difference, a control method thereof, a computer program, and a computer-readable recording medium.

According to an exemplary embodiment of the present invention, there is a control method of an electronic apparatus, including: determining a position of a vehicle that is being operated; determining a terrain height in a region positioned within a predetermined distance from the determined position of the vehicle; comparing a terrain height at the position of the vehicle and the terrain height in the region with each other to calculate a terrain height difference; and generating an information object including guidance information of the vehicle and displaying the generated information object through augmented reality by reflecting the terrain height difference.

The displaying of the generated information object may include determining a mapping position of the information object on a virtual three-dimensional (3D) space for a photographed image of a camera using the terrain height difference.

The control method of an electronic apparatus may further include calculating a vertical rotation angle of the camera installed in the vehicle at the position of the vehicle, wherein the displaying of the generated information object further includes correcting the determined mapping position of the information object using the calculated vertical rotation angle.

The displaying of the generated information object may include: performing calibration on the camera to calculate camera parameters; generating the virtual 3D space for the photographed image of the camera on the basis of the camera parameters; and mapping the generated information object to the virtual 3D space on the basis of the mapping position of the information object depending on the correction.

The displaying of the generated information object may include: converting the virtual 3D space to which the information object is mapped into a two-dimensional (2D) image on the basis of the camera parameters to generate an augmented reality screen; and displaying the generated augmented reality screen.

In the determining of the terrain height, a terrain height of a route positioned within a predetermined distance from the position of the vehicle in an entire route up to a destination may be determined in the case in which the electronic apparatus performs guidance of a route up to the destination.

The information object may include a route guidance object for guiding a route up to a destination, and in the displaying of the generated information object, the route guidance object may be positioned and displayed on a road region of the augmented reality screen.

According to another exemplary embodiment of the present invention, there is an electronic apparatus including: a display unit displaying a screen; a terrain height processing unit determining a terrain height in a region positioned within a predetermined distance from a position of a vehicle that is being operated and comparing a terrain height at the position of the vehicle and the terrain height in the region with each other to calculate a terrain height difference; and a control unit controlling an object generating unit to generate an information object including information of the vehicle and controlling the display unit to display the generated information object through augmented reality by reflecting the terrain height difference.

The control unit may determine a mapping position of the information object on a virtual 3D space for a photographed image of a camera using the terrain height difference.

The electronic apparatus of may further include a camera vertical rotation angle calculating unit calculating a vertical rotation angle of the camera installed in the vehicle at the position of the vehicle, wherein the control unit corrects the determined mapping position of the information object using the calculated vertical rotation angle.

The electronic apparatus may further include: a calibration unit performing calibration on the camera to calculate camera parameters; a 3D space generating unit generating the virtual 3D space for the photographed image of the camera on the basis of the camera parameters; and a mapping unit mapping the generated information object to the virtual 3D space on the basis of the mapping position of the information object depending on the correction.

The control unit may convert the virtual 3D space to which the information object is mapped into a 2D image on the basis of the camera parameters to generate an augmented reality screen, and control the display unit to display the generated augmented reality screen.

The terrain height processing unit may determine a terrain height of a route positioned within a predetermined distance from the position of the vehicle in an entire route up to a destination in the case in which the electronic apparatus performs guidance of a route up to the destination.

The information object may include a route guidance object for guiding a route up to a destination, and the display unit may position and display the route guidance object on a road region of the augmented reality screen.

According to still another exemplary embodiment of the present invention, there is a computer program stored in a recording medium coupled to an electronic apparatus to execute the following steps: determining a position of a vehicle that is being operated: determining a terrain height in a region positioned within a predetermined distance from the determined position of the vehicle; comparing a terrain height at the position of the vehicle and the terrain height in the region with each other to calculate a terrain height difference; and generating an information object including guidance information of the vehicle and displaying the generated information object through augmented reality by reflecting the terrain height difference.

According to yet still another exemplary embodiment of the present invention, there is a computer-readable recording medium in which a computer program for executing a control method of an electronic apparatus is stored, wherein the control method of an electronic apparatus includes: determining a position of a vehicle that is being operated; determining a terrain height in a region positioned within a predetermined distance from the determined position of the vehicle; comparing a terrain height at the position of the vehicle and the terrain height in the region with each other to calculate a terrain height difference; and generating an information object including guidance information of the vehicle and displaying the generated information object through augmented reality by reflecting the terrain height difference.

DETAILED DESCRIPTION

Figure 1:
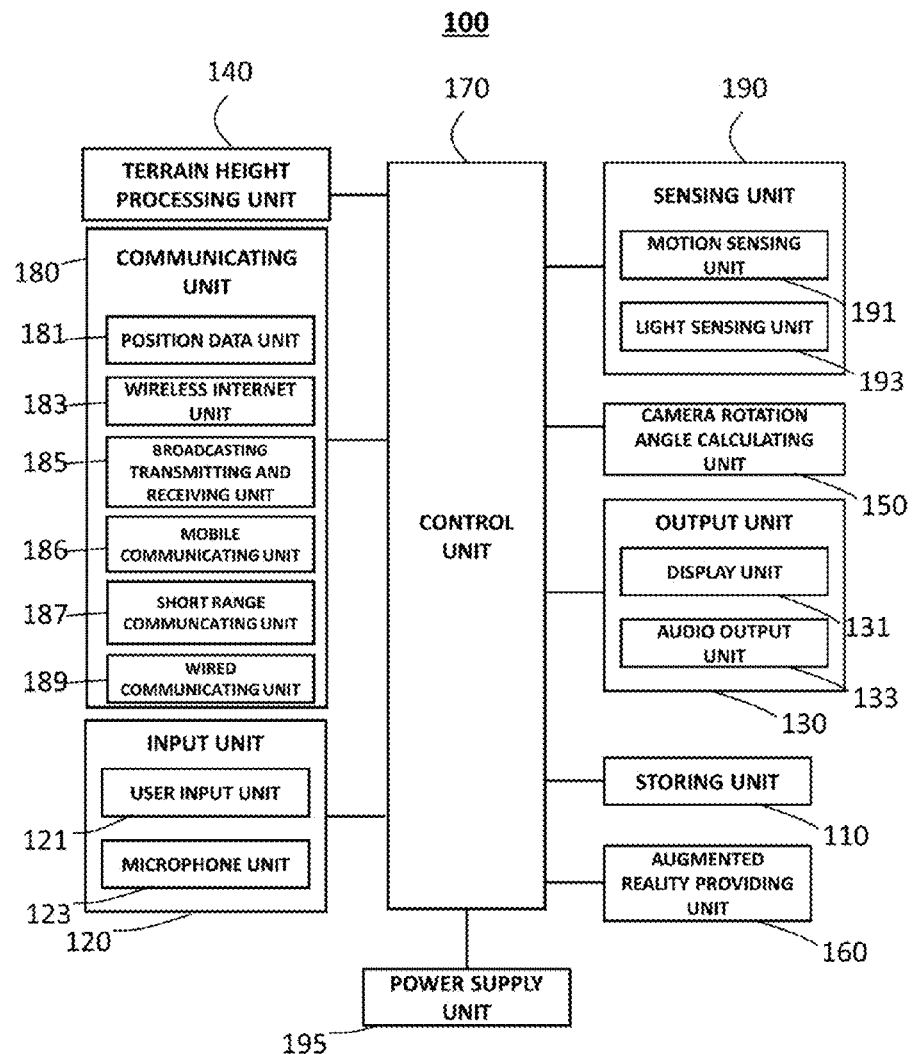
FIG. 1 is a block diagram illustrating an electronic apparatus according to an exemplary embodiment of the present invention.

The following description illustrates only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices invented so as to perform the same function regardless of a structure.

Therefore, it is to be understood that, for example, block diagrams of the present specification illustrate a conceptual aspect of an illustrative circuit for embodying a principle of the present invention. Similarly, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various devices including processors or functional blocks represented as concepts similar to the processors and shown in the accompanying drawings may be provided by using hardware having capability to execute appropriate software as well as dedicated hardware. When the functions are provided by the processors, they may be provided by a single dedicated processor, a single shared processor, or a plurality of individual processors, and some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods of performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a scheme demanded by the claims in the present invention defined by the claims, any means capable of providing these functions are equivalent to means recognized from the present specification.

The above-mentioned objects, features, and advantages will become more obvious from the following detailed description associated with the accompanying drawings. Therefore, those skilled in the art to which the present invention pertains may easily practice a technical idea of the present invention. Further, in describing the present invention, in the case in which it is decided that a detailed description of a well-known technology associated with the present invention may unnecessarily make the gist of the present invention unclear, it will be omitted.

Hereinafter, various exemplary embodiments of the present invention will be described in detail with reference to the accompanying drawings.

FIG. 1 is a block diagram illustrating an electronic apparatus according to an exemplary embodiment of the present invention. Referring to FIG. 1, the electronic apparatus 100 is configured to include all or some of a storing unit 110, an input unit 120, an output unit 130, a terrain height processing unit 140, a camera rotation angle calculating unit 150, an augmented reality providing unit 160, a control unit 170, a communicating unit 180, a sensing unit 190, and a power supply unit 195.

Here, the electronic apparatus 100 may be implemented by various apparatuses such as a smart phone, a tablet computer, a laptop computer, a personal digital assistant (PDA), a portable multimedia player (PMP), a smart glasses, a project glasses, a navigation apparatus, a black box, and the like, that may provide driving related guidance to a driver of a vehicle that is in an operated state, and may be provided in the vehicle.

Here, the operated state of the vehicle may include various states in which the vehicle is being driven by the driver, such as a stopped state of the vehicle, a driven state of the vehicle, a parked state of the vehicle, and the like.

The driving related guidance may include various kinds of guidance for assisting in driving of the driver of the vehicle, such as route guidance, lane departure guidance, front vehicle start guidance, signal lamp change guidance, front vehicle collision preventing guidance, lane change guidance, lane guidance, and the like.

Here, the route guidance may include augmented reality route guidance performing route guidance by combining various information such as a position, a direction, and the like, of a user with an image obtained by photographing the front of the vehicle that is being operated and two-dimensional (2D) or three-dimensional (3D) route guidance performing route guidance by combining various information such as a position, a direction, and the like, of a user with a 2D or 3D map data. Here, the route guidance may be interpreted as a concept including route guidance in the case in which the user walks or runs and moves as well as in the case in which the user gets in the vehicle and then drives the vehicle.

In addition, the lane departure guidance may be to guide whether or not the vehicle that is being driven has departed from a lane.

In addition, the front vehicle start guidance may be to guide whether or not a vehicle positioned in front of a vehicle that is being stopped has started.

In addition, the signal lamp change guidance may be to guide whether or not a signal lamp positioned in front of a vehicle that is being stopped has been changed. As an example, the signal lamp change guidance may be to guide that a state of the signal lamp is changed from a red lamp indicating a stop signal into a green lamp indicating a start signal.

In addition, the front vehicle collision preventing guidance may be to guide that a distance between a vehicle that is being stopped or driven and a vehicle positioned in front of the vehicle is within a predetermined distance in order to prevent collision between the above-mentioned vehicles when the distance between the vehicle that is being stopped or driven and the vehicle positioned in front of the vehicle is within the predetermined distance.

In addition, the lane change guidance may be to guide a change from a lane in which a vehicle is positioned into another lane in order to guide a route up to a destination.

In addition, the lane guidance may be to guide a lane in which a vehicle is currently positioned.

A driving related image such as a front image of the vehicle enabling provision of various kinds of guidance may be photographed by a camera mounted in the vehicle. Here, the camera may be a camera formed integrally with the electronic apparatus 100 mounted in the vehicle and photographing the front of the vehicle. In this case, the camera may be formed integrally with a smart phone, a navigation apparatus, or a black box, and the electronic apparatus 100 may receive the image photographed by the camera formed integrally therewith.

As another example, the camera may be a camera mounted in the vehicle separately from the electronic apparatus 100 and photographing the front of the vehicle. In this case, the camera may be a black box separately mounted toward the front of the vehicle, and the electronic apparatus 100 may receive a photographed image through wired/wireless communication with the separately mounted black box or receive the photographed image when a storage medium storing the photographed image of the black box therein is inserted into the electronic apparatus 100.

Hereinafter, the electronic apparatus 100 according to an exemplary embodiment of the present invention will be described in more detail on the basis of the above-mentioned content.

The storing unit 110 serves to store various data and applications required for an operation of the electronic apparatus 100 therein. Particularly, the storing unit 110 may store data required for the operation of the electronic apparatus 100, for example, an operating system (OS), a route search application, a map data, and the like, therein.

Here, the map data may be stored in and obtained from the storing unit 110 in the electronic apparatus 100, as described above, but is not limited thereto. That is, the map data may be obtained from an external map database (DB) separate from the electronic apparatus 100 or be obtained from another electronic apparatus. The map data, which is a data for indicating a current position and a map of the surrounding zone, may include a plurality of links for indicating roads in various regions, attribute information on each of the plurality of links, information of guidance points, and the like. The attribute information on the link may include information indicating whether or not the link is a bidirectional link or a unidirectional link, information on the number of lanes of the link, information on a kind (for example, an expressway, an urban expressway, a national road, a local road, a general road, or the like) of a road corresponding to the link, and the like. The information of the guidance points may include position information of the guidance points, guidance code information (for example, information for guiding a speed limit, a speed bump, and the like) of the guidance points, and the like.

Here, the guidance point may include an over-speed regulation point, a speed bump point, a railroad crossing point, a joining road point, a branch point, and the like. In addition, in the case in which the guidance point is implemented by a guidance section including a guidance start point and a guidance end point, the guidance point may include section speed regulation section start and end points, school zone start and end points, silver zone start and end points, construction section start and end points, fog warning zone start and end points, accident hazard start and end points, falling rock warning section start and end points, sharp turn section start and end points, slippery surface warning section start and end points, wild animal warning section start and end points, height limit section start and end points, and the like.

In addition, the storing unit 110 may store a digital elevation model (DEM) data, which is a digital model representing a bare earth portion except for buildings, trees, artificial structures, and the like, in real world terrain information, therein.

Further, the storing unit 110 may store a digital surface model (DSM) data, which is a model representing all real world information, that is, terrains, trees, buildings, artificial structures, and the like, therein.

In addition, the storing unit 110 may store data generated by the operation of the electronic apparatus 100, for example, a searched route data, a received image, and the like, therein.

Here, the storing unit 110 may be implemented by a detachable type of storing device such as a universal serial bus (USB) memory, or the like, as well as an embedded type of storing device such as a random access memory (RAM), a flash memory, a read only memory (ROM), an erasable programmable ROM (EPROM), an electronically erasable and programmable ROM (EEPROM), a register, a hard disk, a removable disk, a memory card, a universal subscriber identity module (USIM), or the like.

The input unit 120 serves to convert a physical input from the outside of the electronic apparatus 100 into a specific electrical signal. Here, the input unit 120 may include all or some of a user input unit 121 and a microphone unit 123.

The user input unit 121 may receive a user input such as a touch, a push operation, or the like. Here, the user input unit 121 may be implemented using at least one of a form of various buttons, a touch sensor receiving a touch input, and a proximity sensor receiving an approaching motion.

The microphone unit 123 may receive a speech of the user and a sound generated in the inside and the outside of the vehicle.

The output unit 130 is a unit outputting data of the electronic apparatus 100. Here, the output unit 130 may include all or some of a display unit 131 and an audio output unit 133.

The display unit 131 is a unit outputting data that may be visually recognized in the electronic apparatus 100. The display unit 131 may be implemented by a display unit provided on a front surface of a housing of the electronic apparatus 100. In addition, the display unit 131 may be formed integrally with the electronic apparatus 100 and output visual recognition data, or may be installed separately from the electronic apparatus 100 like a head-up display (HUD) and output visual recognition data.

The audio output unit 133 is a unit outputting data that may be auditorily recognized in the electronic apparatus 100. The audio output unit 133 may be implemented by a speaker representing a data that is to be reported to the user of the electronic apparatus 100 as a sound.

The communicating unit 180 may be provided in order for the electronic apparatus 100 to communicate with other devices. The communicating unit 180 may include all or some of a position data unit 181, a wireless Internet unit 183, a broadcasting transmitting and receiving unit 185, a mobile communicating unit 186, a short range communicating unit 187, and a wired communicating unit 189.

The position data unit 181 is a device obtaining position data through a global navigation satellite system (GNSS). The GNSS means a navigation system that may calculate a position of a receiving terminal using a radio signal received from an artificial satellite. A detailed example of the GNSS may include a global positioning system (GPS), a Galileo system, a global orbiting navigational satellite system (GLONASS), a COMPASS, an Indian regional navigational satellite system (IRNSS), a quasi-zenith satellite system (QZSS), and the like, depending on an operating subject of the GNSS. The position data unit 181 of the electronic apparatus 100 according to an exemplary embodiment of the present invention may obtain position data by receiving GNSS signals served in a zone in which the electronic apparatus 100 is used.

The wireless Internet unit 183 is a device accessing the wireless Internet to obtain or transmit data. The wireless Internet that may be accessed through the wireless Internet unit 183 may be a wireless local area network (WLAN), a wireless broadband (Wibro), a world interoperability for microwave access (Wimax), a high speed downlink packet access (HSDPA), or the like.

The broadcasting transmitting and receiving unit 185 is a device transmitting and receiving broadcasting signals through various broadcasting systems. The broadcasting system that may transmit and receive the broadcasting signals through the broadcasting transmitting and receiving unit 185 may be a digital multimedia broadcasting terrestrial (DMBT), digital multimedia broadcasting satellite (DMBS), a media forward link only (MediaFLO), a digital video broadcast handheld (DVBH), an integrated services digital broadcast terrestrial (ISDBT), or the like. The broadcasting signals transmitted and received through the broadcasting transmitting and receiving unit 185 may include a traffic data, a living data, and the like.

The mobile communicating unit 186 may access a mobile communication network to perform communication depending on various mobile communication protocols such as 3rd generation (3G), 3rd generation partnership project (3GPP), long term evolution (LTE), and the like.

The short range communicating unit 187 is a device for short range communication. The short range communicating unit 187 may perform communication through Bluetooth, radio frequency identification (RFID), infrared data association (IrDA), ultra wideband (UWB), ZigBee, near field communication (NFC), wireless-fidelity (Wi-Fi), or the like, as described above.

The wired communicating unit 189 is an interface device that may connect the electronic apparatus 100 to another device in a wired scheme. The wired communicating unit 189 may be a USB module that may perform communication through a USB port.

The communicating unit 180 may communicate with another device using at least one of the position data unit 181, the wireless Internet unit 183, the broadcasting transmitting and receiving unit 185, the mobile communicating unit 186, the short range communicating unit 187, and the wired communicating unit 189.

As an example, in the case in which the electronic apparatus 100 does not include a camera function, an image photographed by a camera for a vehicle such as a black box, or the like, may be received using at least one of the short range communicating unit 187 and the wired communicating unit 189.

As another example, in the case in which the electronic apparatus communicates with a plurality of devices, the electronic apparatus may communicate with any one of the plurality of devices through the short range communicating unit 187, and communicate with another device of the plurality of devices through the wired communicating unit 189.

The sensing unit 190 is a unit that may sense a current state of the electronic apparatus 100. The sensing unit 190 may include all or some of a motion sensing unit 191 and a light sensing unit 193.

The motion sensing unit 191 may sense motion of the electronic apparatus 100 on a 3D space. The motion sensing unit 191 may include a tri-axial terrestrial magnetism sensor and a tri-axial acceleration sensor. Motion data obtained through the motion sensing unit 191 may be combined with the position data obtained through the position data unit 181 to more accurately calculate a trajectory of the vehicle to which the electronic apparatus 100 is attached.

The light sensing unit 193 is a device measuring surrounding illuminance of the electronic apparatus 100. Brightness of the display unit 131 may be changed so as to correspond to surrounding brightness using illuminance data obtained through the light sensing unit 193.

The power supply unit 195 is a device supplying power required for an operation of the electronic apparatus 100 or an operation of another device connected to the electronic apparatus 100. The power supply unit 195 may be a device receiving power from an external power supply such as a battery embedded in the electronic apparatus 100, the vehicle, or the like. Alternatively, the power supply unit 195 may be implemented by a device receiving power in a wired scheme or a device receiving power in a wireless scheme depending on a scheme in which it receives the power.

The terrain height processing unit 140 may determine a terrain height. In detail, the terrain height processing unit 140 may determine a terrain height at a position of the vehicle and a terrain height in a region positioned within a predetermined distance from the position of the vehicle using the DEM data, which is the digital model representing the bare earth portion except for the buildings, the trees, the artificial structures, and the like, in the real world terrain information or the DSM data, which is the model representing all the real world information, that is, the terrain, the trees, the building, the artificial structure, and the like. Here, the DEM data or the DSM data may be obtained from the storing unit 110 in the electronic apparatus 100, be obtained from an external database (DB) separate from the electronic apparatus 100, or be obtained from another electronic apparatus 100.

In this case, the terrain height processing unit 140 may determine a terrain height at the position of the vehicle obtained from the position data unit 181 and a terrain height in a region positioned within a predetermined distance from the position of the vehicle. Here, the region positioned within the predetermined distance from the position of the vehicle may be set to an optimal distance in order to improve a data processing speed of the electronic apparatus 100. As an example, in the case in which the electronic apparatus 100 performs guidance of a route up to a destination depending on a route guidance request of the user, the terrain height processing unit 140 may determine a terrain height of a route (for example, a road on which the vehicle is to be driven later) positioned in front of the vehicle by a predetermined distance in an entire route up to the destination.

In addition, the terrain height processing unit 140 may compare the terrain height at the position of the vehicle and the terrain height in the region positioned within the predetermined distance from the position of the vehicle with each other to calculate a terrain height difference. In detail, the terrain height processing unit 140 may calculate a relative difference between the terrain height at the position of the vehicle and the terrain height in the region positioned within the predetermined distance from the position of the vehicle using the following Equation 1.

$$H = P0 - P1 \qquad \text{[Equation 1]}$$

Here, H is a terrain height difference, P0 is a terrain height at a current position of a vehicle, and P1 is a terrain height at a point spaced apart from the current position of the vehicle by a predetermined distance.

Meanwhile, the camera rotation angle calculating unit 150 may calculate a rotation angle of a camera installed in the vehicle at the position of the vehicle. This will be described in detail with reference to FIG. 2.

Figure 2:
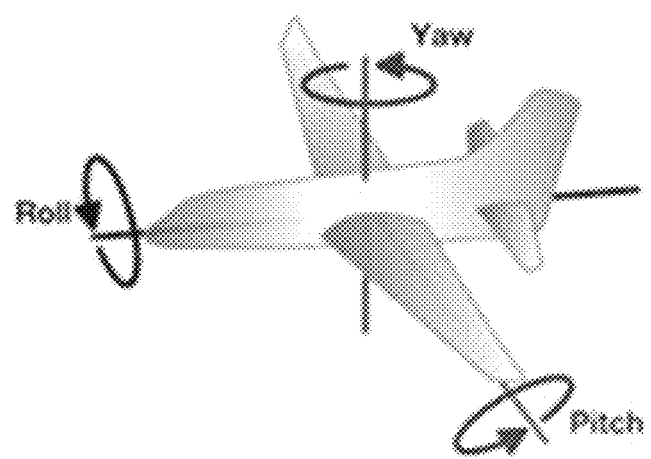
FIG. 2 is a view for describing PITCH, ROLL, and YAW.

Referring to FIG. 2, rotation movement of the vehicle in relation to an x axis may be defined as roll, rotation movement of the vehicle in relation to a y axis may be defined as pitch, and rotation movement of the vehicle in relation to a z axis may be defined as yaw.

Referring to this, the camera rotation angle calculating unit 150 according to an exemplary embodiment of the present invention may calculate a roll direction rotation angle, a pitch direction rotation angle, and a yaw direction rotation angle of the camera installed in the vehicle at the position of the vehicle.

Particularly, the camera rotation angle calculating unit 150 may calculate the pitch direction rotation angle (hereinafter, referred to as a vertical direction rotation angle). Here, the vertical direction rotation angle may be an angle formed by an optical axis of the camera and a horizontal line.

In this case, as an example, the camera rotation angle calculating unit 150 may calculate the vertical direction rotation angle of the camera on the basis of a signal sensed in a gradient sensor of the sensing unit 190. Alternatively, as another example, the camera rotation angle calculating unit 150 may calculate the vertical direction rotation angle of the camera on the basis of an angle formed by an extended line of a line connecting a height at the current position of the vehicle and heights at points positioned in front of the current position by a predetermined distance to each other and a horizontal line.

Meanwhile, the electronic apparatus 100 according to an exemplary embodiment of the present invention may include the augmented reality providing unit 160 providing an augmented reality view mode. Here, augmented reality is a method of visually overlapping and providing additional information (for example, a graphic element indicating a point of interest (POI), a graphic element indicating a route up to a destination, information required for an operation such as user additional information, buildings, and the like) with and on a screen including a real world actually viewed by the user. In an exemplary embodiment of the present invention, additional information such as information required for operating the vehicle, vehicle state information, driver required information, or the like, information representing buildings, POIs, and the like, overlapped and displayed with an actual image in the augmented reality view mode will be called an information object, and an object expressed in the augmented reality view mode in order to provide information required by the driver in addition to the above-mentioned information will also be called the information object. This will be described in detail with reference to FIG. 3.

Figure 3:
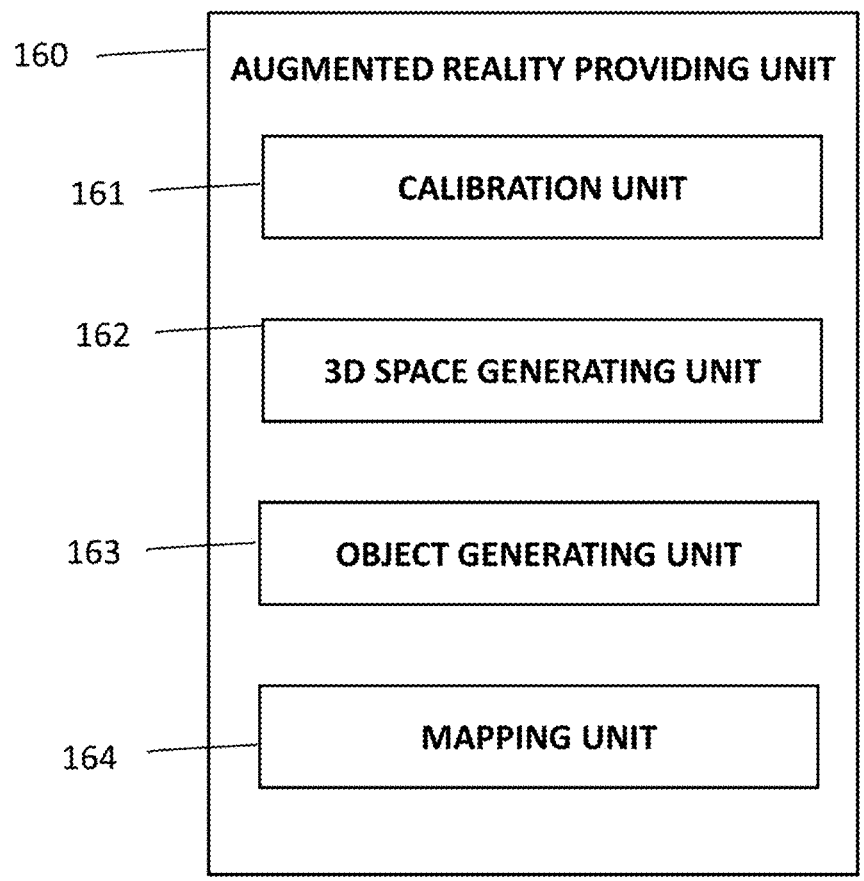
FIG. 3 is a block diagram illustrating an augmented reality providing unit according to an exemplary embodiment of the present invention in detail.

FIG. 3 is a block diagram illustrating an augmented reality providing unit 160 according to an exemplary embodiment of the present invention in detail. Referring to FIG. 3, the augmented reality providing unit 160 may include all or some of a calibration unit 161, a 3D space generating unit 162, an object generating unit 163, and a mapping unit 164.

The calibration unit 161 may perform calibration for estimating camera parameters corresponding to the camera from the photographed image photographed in the camera. Here, the camera parameters, which are parameters configuring a camera matrix, which is information indicating a relationship between a real space and a photograph, may include camera extrinsic parameters and camera intrinsic to FIG. 4A.

Figures 4A, 4B:
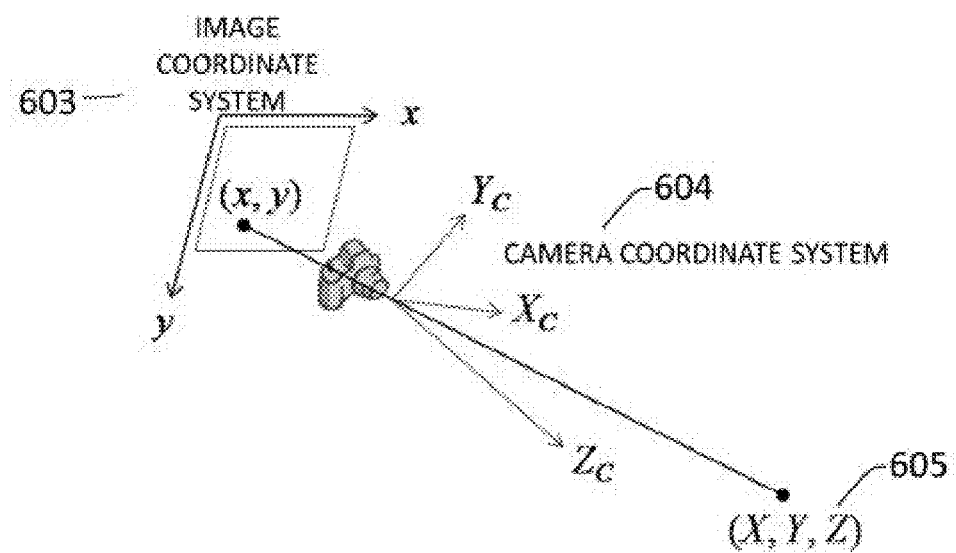
FIGS. 4A and 4B are views illustrating a conversion relationship between a two-dimensional (2D) photographed image and a virtual three-dimensional (3D) space according to an exemplary embodiment of the present invention.

Referring to FIG. 4A, the camera parameters may include camera extrinsic parameters 601 and camera intrinsic parameters 602. Here, fx and fy of the camera intrinsic parameters 602 may be focal lengths, cx and cy thereof may be principal points, and skew_cfx=tan α thereof may be a skew coefficient. In addition, the camera extrinsic parameters 601 may be a rotation/movement transformation matrix for transforming a coordinate (X, Y, Z) of a 3D point on a world coordinate system 605 into a coordinate (Xc, Yc, Zc) of a 3D point of a camera coordinate system 604. Since the camera extrinsic parameters are not unique parameters of the camera, they may be changed depending on at which position and in which direction the camera is installed, and may be changed depending on how the world coordinate system is defined.

The 3D space generating unit 162 may generate a virtual 3D space on the basis of the photographed image photographed in the camera. In detail, the 3D space generating unit 162 may generate the virtual 3D space by applying the camera parameters estimated by the calibration unit 161 to a 2D photographed image. This will be described in detail with reference to FIG. 4B.

Referring to FIG. 4B, the photographed image of the camera may be obtained by perspective projection of points on a 3D space of the world coordinate system 605 onto a 2D image plane of an image coordinate system 603. Therefore, the 3D space generating unit 162 of the electronic apparatus 100 may generate a virtual 3D space of the world coordinate system 605 for the photographed image of the camera by performing an inverse process to the above-mentioned operation on the basis of the camera parameters.

The object generating unit 163 may generate information objects for guidance, for example, a route guidance object for guiding a route up to a destination, a lane change guidance object, a lane departure guidance object, a user required information object, and the like, on the augmented reality. Here, the object may be implemented by a 3D object, an image, an art line, or the like.

The mapping unit 164 may map the object generated in the object generating unit 163 to the virtual 3D space generated in the 3D space generating unit 162. In detail, the mapping unit 164 may determine a mapping position of the object generated in the object generating unit 163 on the virtual 3D space, and perform mapping of the object to the determined position. In this case, the mapping unit 164 may determine the mapping position by reflecting the terrain height difference calculated in the terrain height processing unit 140 and/or the vertical rotation angle of the camera calculated in the camera rotation angle calculating unit 150.

Meanwhile, the control unit 170 controls a general operation of the electronic apparatus 100. In detail, the control unit 170 may control all or some of the storing unit 110, the input unit 120, the output unit 130, the terrain height processing unit 140, the camera rotation angle calculating unit 150, the augmented reality providing unit 160, the communicating unit 180, the sensing unit 190, and the power supply unit 195.

Particularly, the control unit 170 may control the display unit 131 to display the information object for guidance of the vehicle through the augmented reality by reflecting the terrain height difference calculated in the terrain height processing unit 140 and/or the vertical rotation angle of the camera calculated in the camera rotation angle calculating unit 150. This will be described in detail with reference to FIG. 5.

Figure 5:
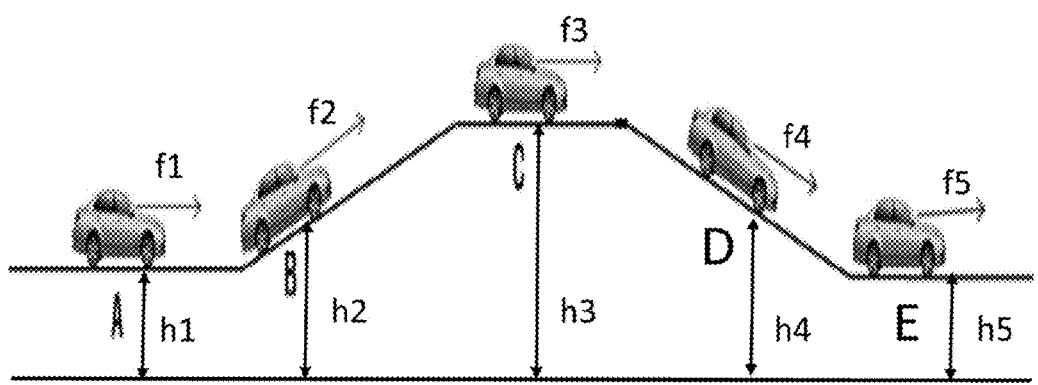
FIG. 5 is a view illustrating a road on which a vehicle according to an exemplary embodiment of the present invention is positioned at the time of being driven.

FIG. 5 is a view illustrating a road on which a vehicle according to an exemplary embodiment of the present invention is positioned at the time of being driven. In FIG. 5, a case in which a vehicle is driven on each of an upward inclined road, which is an ascent road, a horizontal road, which is a non-inclined road, and a downward inclined road, which is a descent road, will be described for convenience of explanation for an exemplary embodiment of the present invention. Referring to FIG. 5, the vehicle that is being driven forward may be first positioned on a horizontal road A, may be positioned on an upward inclined road B after passing through the horizontal road A, and may be positioned on a horizontal road C after passing through the upward inclined road B. In addition, the vehicle passing through the horizontal road C may be later positioned on a downward inclined road D, and may be positioned on a horizontal road E after passing through the downward inclined road D.

In the case in which an information object for a front region B is displayed in a state in which the vehicle is positioned on the horizontal road A, the terrain height processing unit 140 may determine a terrain height h1 at a position A and a terrain height h2 or h3 in a front region (for example, B or C) and compare the terrain heights at both positions with each other to calculate a terrain height difference between a terrain at the current position and a terrain in the front region.

In addition, the 3D space generating unit 162 may generate a virtual 3D space for a photographed image of the front region on the basis of the camera parameters calculated in the calibration unit 161.

In addition, the control unit 170 may determine a mapping position of the information object on the generated virtual 3D space using the terrain height difference. In more detail, in the case in which an information object for a front region B is displayed in the state in which the vehicle is positioned on the horizontal road A, a mapping position of the information object on the virtual 3D space corresponding to a position B of the front region may be determined to be higher than a mapping position in the case in which a terrain height difference is 0, by reflecting h2−h1, which is a terrain height difference between the terrain height at the position B and the terrain height at the position A.

Meanwhile, in the case in which the vehicle is positioned on the horizontal road A, an angle formed by an optical axis f1 of the camera and a horizontal line is 0, such that the control unit 170 may not perform correction of the mapping position in which the vertical direction rotation angle of the camera is considered.

However, in the case in which the vehicle is positioned on the upward inclined road B, an optical axis f2 of the camera forms an upward angle in relation to the horizontal line, such that a view point of the camera is formed to be higher than that in the case in which the vehicle is positioned on the horizontal road having the same height as that of B. Alternatively, in the case in which the vehicle is positioned on the downward inclined road D, an optical axis f4 of the camera forms a downward angle in relation to the horizontal line, such that a view point of the camera is formed to be lower than that in the case in which the vehicle is positioned on the horizontal road having the same height as that of D. In this case, when the information object is expressed by reflecting only the above-mentioned terrain height difference, the information object may not be expressed at an appropriate position in an augmented reality screen. For example, although it is desirable to express the route guidance object for performing guidance of the route up to the destination on a road region in the augmented reality screen, a problem that the route guidance object is expressed on a sky region above the road region, or the like, may occur.

Therefore, in the case in which the vehicle is positioned on the upward inclined road B or the downward inclined road D, the control unit 170 may correct the determined mapping position of the information object by reflecting the rotation angle of the camera. In more detail, in the case in which the vehicle is positioned on the upward inclined road B or the downward inclined road D, the control unit 170 may perform a first processing step of determining the mapping position of the information object using the terrain height difference calculated in the terrain height processing unit 140 and perform a second processing step of correcting the mapping position determined in the first processing step by reflecting the vertical rotation angle of the camera calculated in the camera rotation angle calculating unit 150, thereby determining a final mapping position of the information object. Hereinafter, an operation of the electronic apparatus 100 according to an exemplary embodiment of the present invention in the case in which the vehicle is positioned on the upward inclined road B or the downward inclined road D will be described in more detail. In the case in which an information object for a front region C is displayed in a state in which the vehicle is positioned on the upward inclined road B, the terrain height processing unit 140 may determine the terrain height h2 at the position B and a terrain height h3 in a front region (for example, C) and compare the terrain heights at both positions with each other to calculate a terrain height difference.

In addition, the 3D space generating unit 162 may generate a virtual 3D space for a photographed image of the front region on the basis of the camera parameters calculated in the calibration unit 161. In addition, the control unit 170 may perform the first processing step of determining the mapping position of the information object on the generated virtual 3D space using the terrain height difference. According to the first processing step, the mapping position of the information object on the virtual 3D space corresponding to a position C of the front region may be determined to be higher than that in the case in which the terrain height difference is 0, by reflecting h3−h2, which is a terrain height difference between the terrain height at the position C and the terrain height at the position B.

However, in the case in which the vehicle is positioned on the upward inclined road B, the optical axis f2 of the camera forms an upward angle in relation to the horizontal line, such that a view point of the camera is formed to be higher than that in the case in which the vehicle is positioned on the horizontal road having the same height as that of B. In this case, when the information object is expressed using only the mapping position determined in the first processing step, the information object may not be expressed at an appropriate position in the augmented reality screen.

Therefore, the control unit 170 may perform the second processing step of correcting the mapping position determined in the first processing step in consideration of an upward rotation angle of the camera. According to the second processing step, the mapping position (for example, the mapping position determined on the virtual 3D space corresponding to the position C of the front region) determined according to the first processing step may be corrected to be lower than that in the case in which the upward rotation angle is 0, by reflecting the upward rotation angle of the camera.

In the case in which an information object for the downward inclined road D is displayed in a state in which the vehicle is positioned on the horizontal road C, the terrain height processing unit 140 may determine the terrain height h3 at the position C and a terrain height h4 in a front region (for example, D) and compare the terrain heights at both positions with each other to calculate a terrain height difference.

In addition, the 3D space generating unit 162 may generate a virtual 3D space for a photographed image of the front region on the basis of the camera parameters calculated in the calibration unit 161.

In addition, the control unit 170 may determine a mapping position of the information object on the generated virtual 3D space using the terrain height difference. In more detail, in the case in which an information object for the front region D is displayed in the state in which the vehicle is positioned on the horizontal road C, a mapping position of the information object on the virtual 3D space corresponding to a position D of the front region may be determined to be lower than a mapping position in the case in which a terrain height difference is 0, by reflecting h4−h3, which is a terrain height difference between the terrain height at the position D and the terrain height at the position C.

Meanwhile, in the case in which an information object for a front region E is displayed in a state in which the vehicle is positioned on the downward inclined road D, the terrain height processing unit 140 may determine the terrain height h4 at the position D and a terrain height h5 in a front region (for example, E) and compare the terrain heights at both positions with each other to calculate a terrain height difference.

In addition, the 3D space generating unit 162 may generate a virtual 3D space for a photographed image of the front region on the basis of the camera parameters calculated in the calibration unit 161. In addition, the control unit 170 may perform the first processing step of determining the mapping position of the information object on the generated virtual 3D space using the terrain height difference. According to the first processing step, the mapping position of the information object on the virtual 3D space corresponding to a position E of the front region may be determined to be lower than that in the case in which the terrain height difference is 0, by reflecting h5−h4, which is a terrain height difference between the terrain height at the position E and the terrain height at the position D.

However, in the case in which the vehicle is positioned on the downward inclined road D, the optical axis f4 of the camera forms a downward angle in relation to the horizontal line, such that a view point of the camera is formed to be lower than that in the case in which the vehicle is positioned on the horizontal road having the same height as that of D. In this case, when the information object is expressed using only the mapping position determined in the first processing step, the information object may not be expressed at an appropriate position in the augmented reality screen.

Therefore, the control unit 170 may perform the second processing step of correcting the mapping position determined in the first processing step in consideration of a downward rotation angle of the camera. According to the second processing step, the mapping position (for example, the mapping position determined on the virtual 3D space corresponding to the position E of the front region) determined according to the first processing step may be corrected to be higher than that in the case in which the downward rotation angle is 0, by reflecting the downward rotation angle of the camera.

Meanwhile, when the mapping position is determined depending on the above-mentioned operation, the control unit 170 may convert the virtual 3D space to which the information object is mapped into a 2D image on the basis of the camera parameters to generate an augmented reality screen. In addition, the control unit 170 may control the display unit 131 to display the generated augmented reality screen.

Here, the information object displayed on the augmented reality may include the route guidance object for guiding the route up to the destination. The route guidance object may be displayed on the road region of the augmented reality screen depending on a position determining algorithm of the control unit 170 described above. That is, the guide object may be expressed as if it is positioned on the road of the augmented reality screen.

In addition, the information object displayed on the augmented reality may include a point of interest (POI) period, a turn guidance object informing a turn section, and the like.

According to the present invention described above, a virtual height on the virtual 3D space is determined so as to correspond to a height difference of an actual terrain on which the vehicle is to be driven, thereby making it possible to express the virtual information object at the same position as that of the real world, and a calculating process is also very simple, thereby making it possible to perform real time processing in an embedded environment.

In addition, according to the present invention described above, the virtual information object is dynamically expressed by an augmented reality method, thereby making it possible to provide effective guidance to the driver, cause an interest of the driver, and promote safe driving and convenience of the driver for the vehicle.

Figure 6:
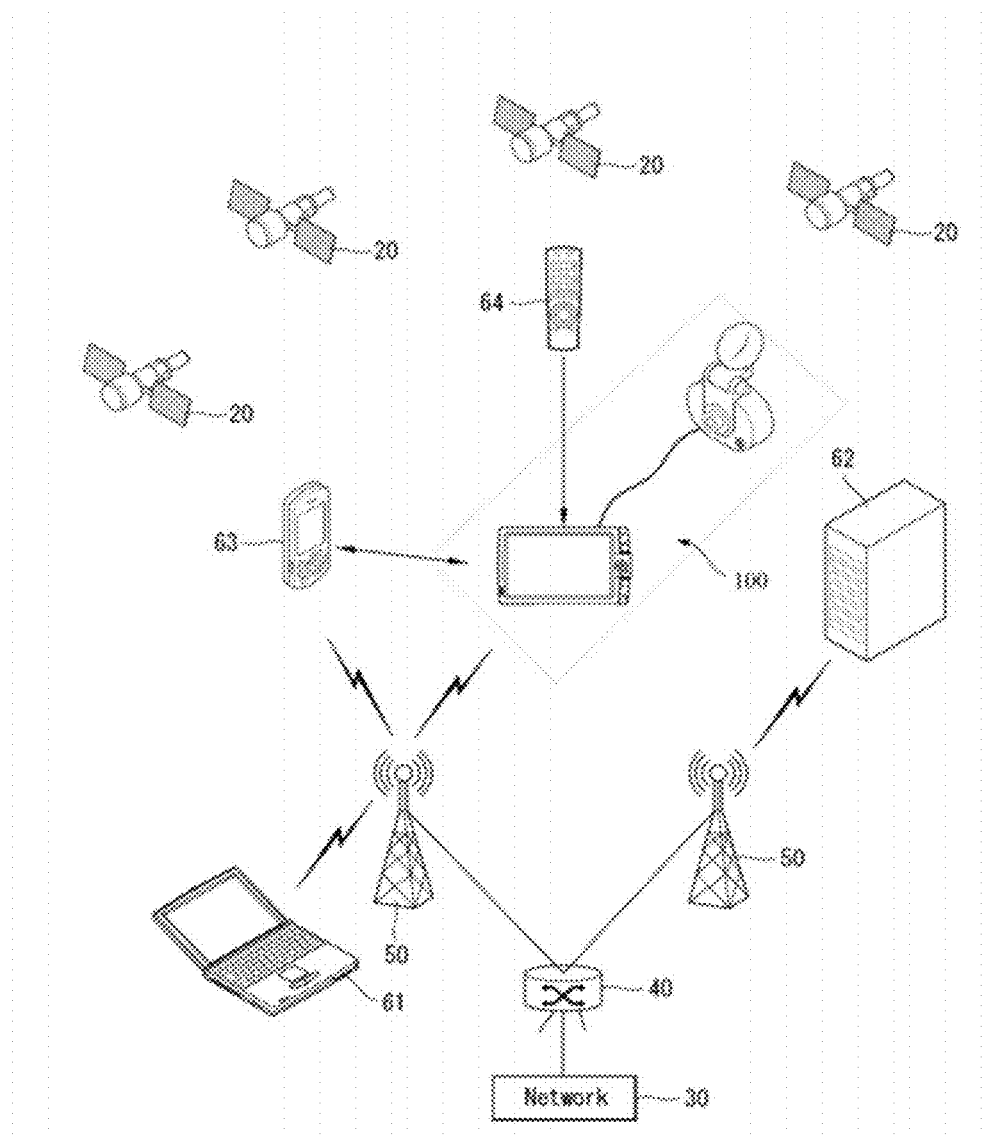
FIG. 6 is a view for describing a system network connected to the electronic apparatus according to an exemplary embodiment of the present invention.

FIG. 6 is a view for describing a system network connected to the electronic apparatus according to an exemplary embodiment of the present invention. Referring to FIG. 6, the electronic apparatus 100 according to an exemplary embodiment of the present invention may be implemented as various apparatuses provided in the vehicle, such as a navigation apparatus, a black box, a smart phone, other vehicle augmented reality interface providing apparatuses, or the like, and may be connected to various communication networks and other electronic devices 61 to 64.

In addition, the electronic apparatus 100 may interwork GPS modules with each other depending on radio signals received from artificial satellites 20 to calculate a current position and a current time.

The respective artificial satellites 20 may transmit L band frequencies of which frequency bands are different from each other. The electronic apparatus 100 may calculate the current position on the basis of a time required for the L band frequencies transmitted by the respective artificial satellites 20 to arrive at the electronic apparatus 100.

Meanwhile, the electronic apparatus 100 may wirelessly access a network 30 through an access control router (ACR) 40, a radio access station (RAS) 50, and the like, via the communicating unit 180. When the electronic apparatus 100 accesses the network 30, the electronic apparatus 100 may be indirectly connected to other electronic devices 61 and 62 accessing the network 30 to exchange data.

Meanwhile, the electronic apparatus 100 may also indirectly access the network 30 through another device 63 having a communication function. For example, in the case in which a module that may access the network 30 is not included in the electronic apparatus 100, the electronic apparatus 100 may communicate with another device 63 having the communication function through a short range communication module, or the like.

Figure 7:
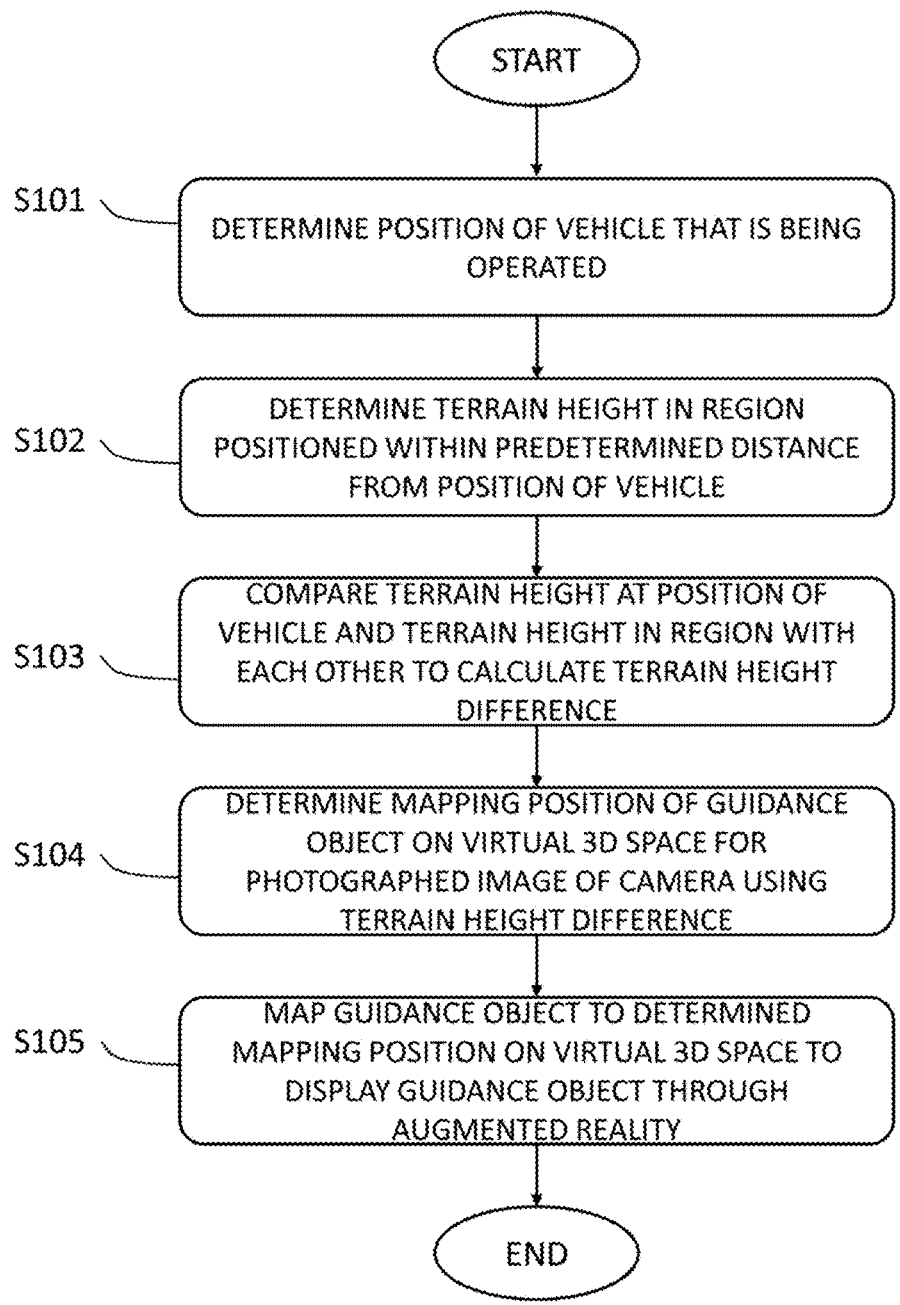
FIG. 7 is a flow chart illustrating a method of displaying an augmented reality screen by reflecting a terrain height difference according to an exemplary embodiment of the present invention.

FIG. 7 is a flow chart illustrating a method of displaying an augmented reality screen by reflecting a terrain height difference according to an exemplary embodiment of the present invention. Referring to FIG. 7, the electronic apparatus 100 may determine the position of the vehicle that is being operated (S101). In detail, the position data unit 181 of the electronic apparatus 100 may obtain the position data through the GNSS.

Then, the electronic apparatus 100 may determine the terrain height in the region positioned within a predetermined distance from the determined position of the vehicle (S102). In detail, the terrain height processing unit 140 of the electronic apparatus 100 may determine the terrain height at the position of the vehicle and the terrain height in the region positioned within the predetermined distance from the position of the vehicle using the DEM data or the DSM data.

Then, the electronic apparatus 100 may compare the terrain height at the position of the vehicle and the terrain height in the region with each other to calculate the terrain height difference (S103). In detail, the terrain height processing unit 140 of the electronic apparatus 100 may determine the terrain height at the position of the vehicle obtained from the position data unit 181 and the terrain height in the region positioned within the predetermined distance from the position of the vehicle.

Then, the electronic apparatus 100 may determine the mapping position of the information object on the virtual 3D space for the photographed image of the camera using the terrain height difference (S104). As an example, the mapping position of the information object on the virtual 3D space corresponding to the position B of the front region may be determined by reflecting the terrain height difference between the terrain height at the position B and the terrain height at the position A.

Then, the electronic apparatus 100 may map the information object to the determined mapping position on the virtual 3D space to display the information object through the augmented reality (S105). In detail, the control unit 170 may convert the virtual 3D space to which the information object is mapped into the 2D image on the basis of the camera parameters to generate the augmented reality screen, and control the display unit 131 to display the generated augmented reality screen.

Figure 8:
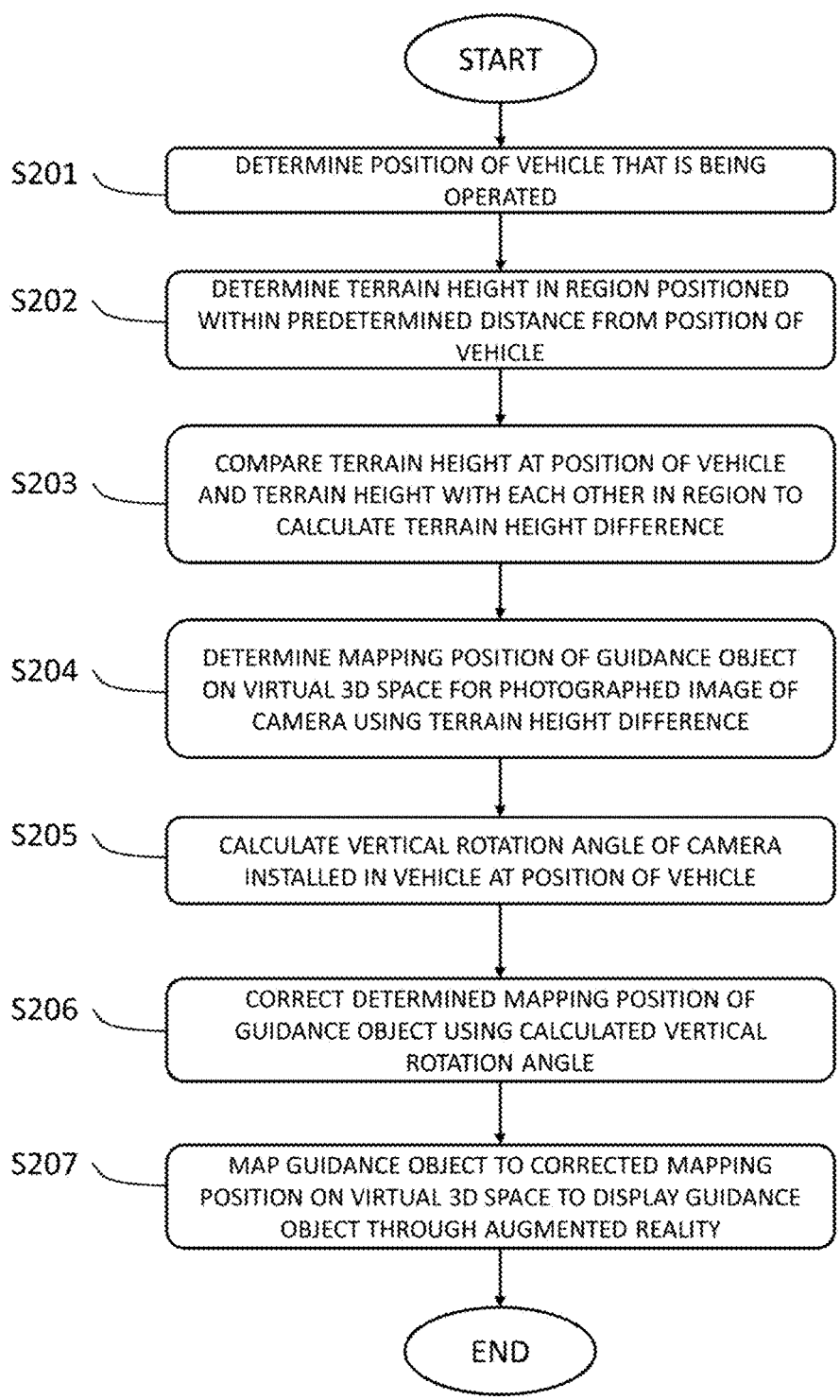
FIG. 8 is a flow chart illustrating a method of displaying an augmented reality screen by reflecting a terrain height difference and a vertical rotation angle of a camera according to an exemplary embodiment of the present invention.

FIG. 8 is a flow chart illustrating a method of displaying an augmented reality screen by reflecting a terrain height difference and a vertical rotation angle of a camera according to an exemplary embodiment of the present invention. Referring to FIG. 8, the electronic apparatus 100 may determine the position of the vehicle that is being operated (S201).

Then, the electronic apparatus 100 may determine the terrain height in the region positioned within a predetermined distance from the determined position of the vehicle (S202).

Then, the electronic apparatus 100 may compare the terrain height at the position of the vehicle and the terrain height in the region with each other to calculate the terrain height difference (S203).

Then, the electronic apparatus 100 may determine the mapping position of the information object on the virtual 3D space for the photographed image of the camera using the terrain height difference (S204).

Then, the electronic apparatus 100 may calculate the vertical rotation angle of the camera installed in the vehicle at the position of the vehicle (S205).

Then, the electronic apparatus 100 may correct the determined mapping position of the information object using the calculated vertical rotation angle (S206). In detail, in the case in which the camera forms an upward angle in the current position of the vehicle, the terrain height difference may be reflected on the virtual 3D space corresponding to the front region of the vehicle to correct the determined mapping position so as to be lower than the mapping position in the case in which an upward rotation angle is 0 at the current position of the vehicle. In addition, in the case in which the camera forms a downward angle in the current position of the vehicle, the terrain height difference may be reflected on the virtual 3D space corresponding to the front region of the vehicle to correct the determined mapping position so as to be higher than the mapping position in the case in which an upward rotation angle is 0 at the current position of the vehicle.

Then, the electronic apparatus 100 may map the information object to the corrected mapping position on the virtual 3D space to display the information object through the augmented reality (S207).

Figure 9A:
FIGS. 9A and 9B are views illustrating augmented reality screens on an upward inclined road according to an exemplary embodiment of the present invention.
Figure 9B:

FIGS. 9A and 9B are views illustrating augmented reality screens on an upward inclined road according to an exemplary embodiment of the present invention. Referring to FIGS. 9A and 9B, FIG. 9A illustrates a case in which an algorithm according to an exemplary embodiment of the present invention is not applied, and FIG. 9B illustrates a case in which an algorithm according to an exemplary embodiment of the present invention is applied.

Referring to FIG. 9A, it may be appreciated that in the case in which the algorithm according to an exemplary embodiment of the present invention is not applied, a route guidance object 901 is not expressed at an accurate position on an upward inclined road portion (an end portion of a route guidance object far away from a current position of a vehicle of FIG. 9A) in which a height difference on an actual terrain is generated.

However, referring to FIG. 9B, it may be appreciated that in the case in which the algorithm according to an exemplary embodiment of the present invention is applied, a route guidance object 902 corresponding to a route line is expressed at an accurate position on an upward inclined road portion (an end portion of a route guidance object far away from a current position of a vehicle of FIG. 9B) in which a height difference on an actual terrain is generated.

Figure 10A:
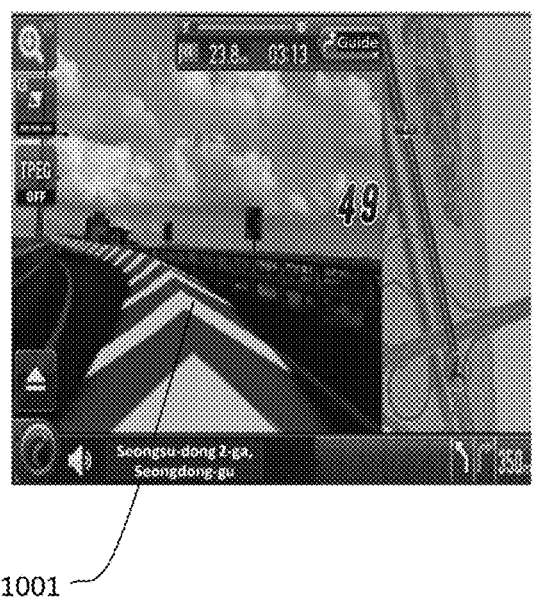
FIGS. 10A to 11B are views illustrating augmented reality screens on a downward inclined road according to an exemplary embodiment of the present invention.
Figure 10B:
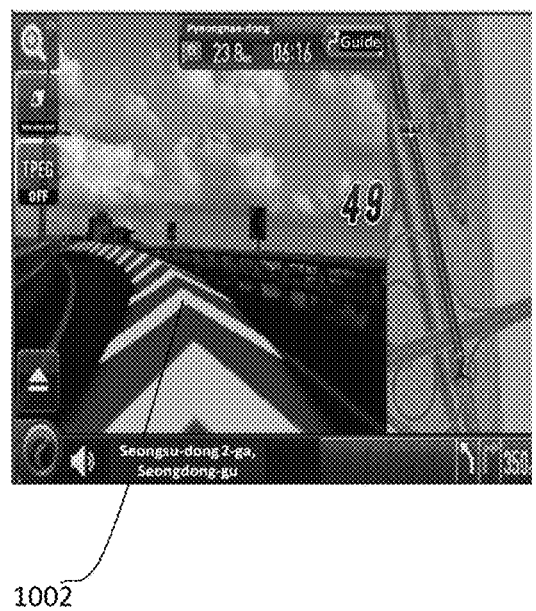
Figure 11A:
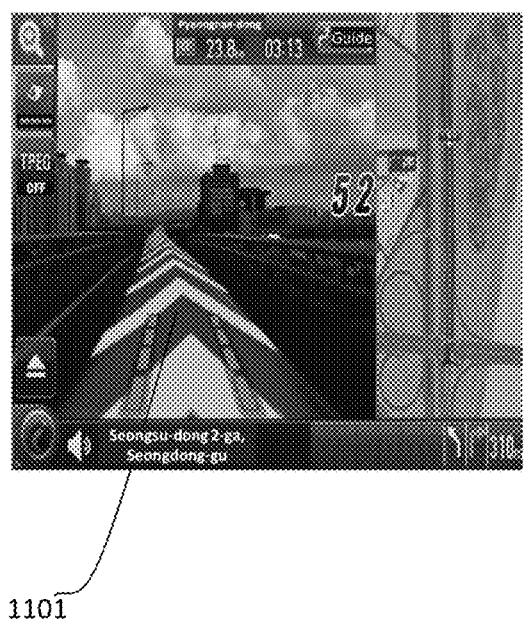
Figure 11B:
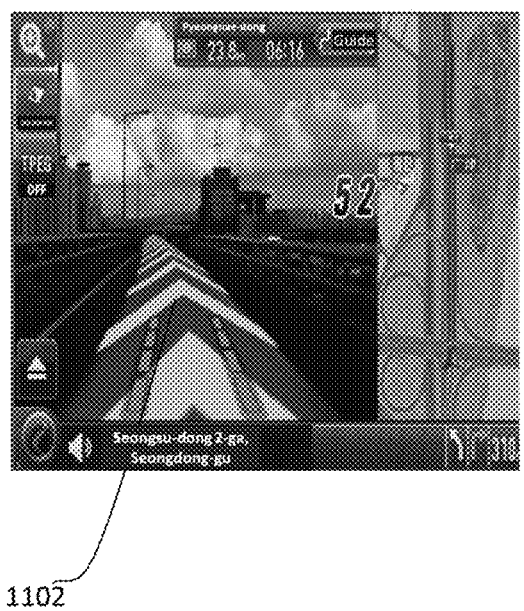

FIGS. 10A to 11B are views illustrating augmented reality screens on a downward inclined road according to an exemplary embodiment of the present invention. Referring to FIGS. 10A to 11B, FIGS. 10A and 11A illustrate a case in which an algorithm according to an exemplary embodiment of the present invention is not applied, and FIGS. 10B and 11B illustrate a case in which an algorithm according to an exemplary embodiment of the present invention is applied.

Referring to FIGS. 10A and 11A, it may be appreciated that in the case in which the algorithm according to an exemplary embodiment of the present invention is not applied, a route guidance object 1001 or 1101 corresponding to a route line is not expressed at an accurate position on a downward inclined road (an end portion of a route guidance object far away from a current position of a vehicle) in which a height difference on an actual terrain is generated.

However, referring to FIGS. 10B and 11B, it may be appreciated that in the case in which the algorithm according to an exemplary embodiment of the present invention is applied, a route guidance object 1002 or 1102 corresponding to a route line is expressed at an accurate position on a downward inclined road (an end portion of a route guidance object far away from a current position of a vehicle) in which a height difference on an actual terrain is generated.

Figure 12:
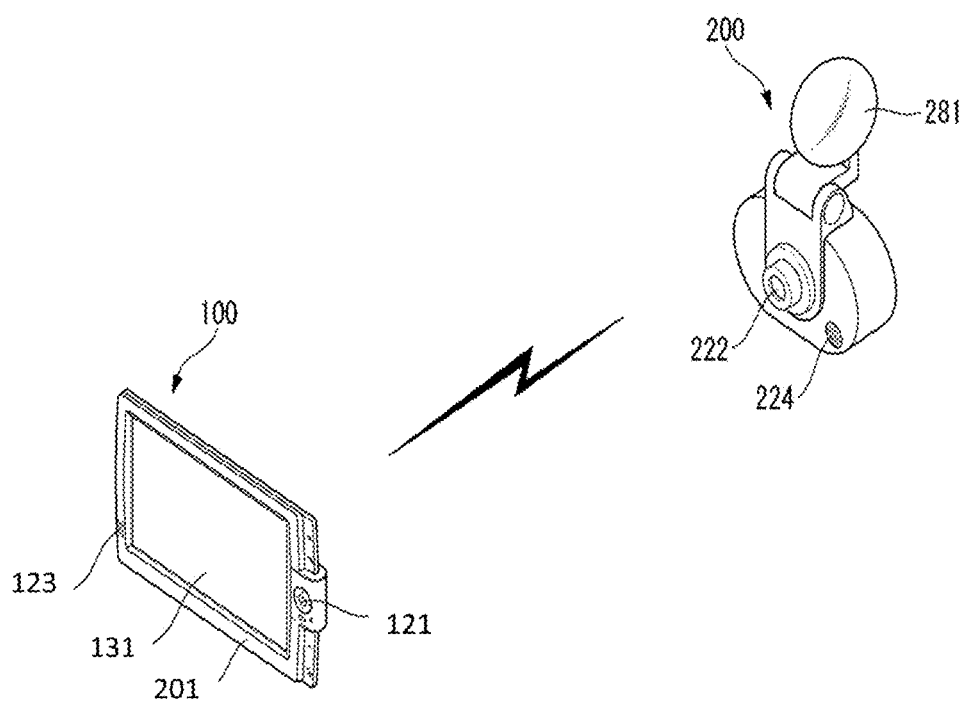
FIG. 12 is a view illustrating an implementation in the case in which a navigation apparatus according to an exemplary embodiment of the present invention does not include a photographing unit.

FIG. 12 is a view illustrating an implementation in the case in which a navigation apparatus according to an exemplary embodiment of the present invention does not include a photographing unit. Referring to FIG. 12, a navigation apparatus 100 for a vehicle and a separately provided black box 200 for a vehicle may configure a system according to an exemplary embodiment of the present invention using a wired/wireless communication scheme.

The navigation apparatus 100 for a vehicle may include a display unit 131 provided on a front surface of a navigation housing 201, a navigation manipulation key 121, and a navigation microphone 123.

The black box 200 for a vehicle may include a black box camera 222, a black box microphone 224, and an attaching part 281.

Figure 13:
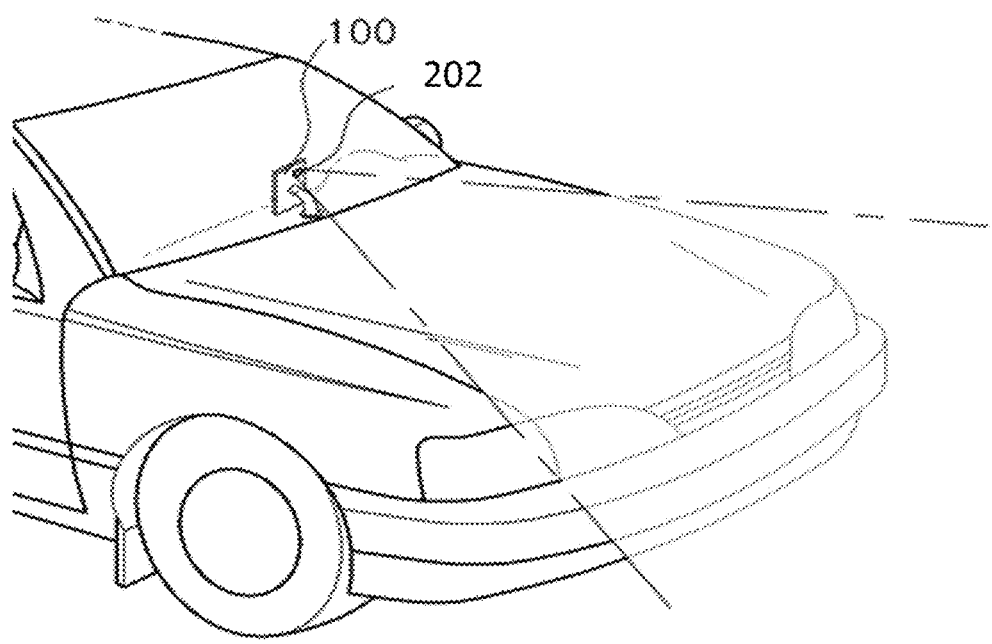
FIG. 13 is a view illustrating an implementation in the case in which a navigation apparatus according to an exemplary embodiment of the present invention includes a photographing unit.

FIG. 13 is a view illustrating an implementation in the case in which a navigation apparatus according to an exemplary embodiment of the present invention includes a photographing unit. Referring to FIG. 13, in the case in which the navigation apparatus 100 includes the photographing unit 202, the user may mount the navigation apparatus 100 so that the photographing unit 150 of the navigation apparatus 100 photographs the front of the vehicle and the display unit of the navigation apparatus 100 may be recognized by the user. Therefore, a system according to an exemplary embodiment of the present invention may be implemented.

Figure 14:
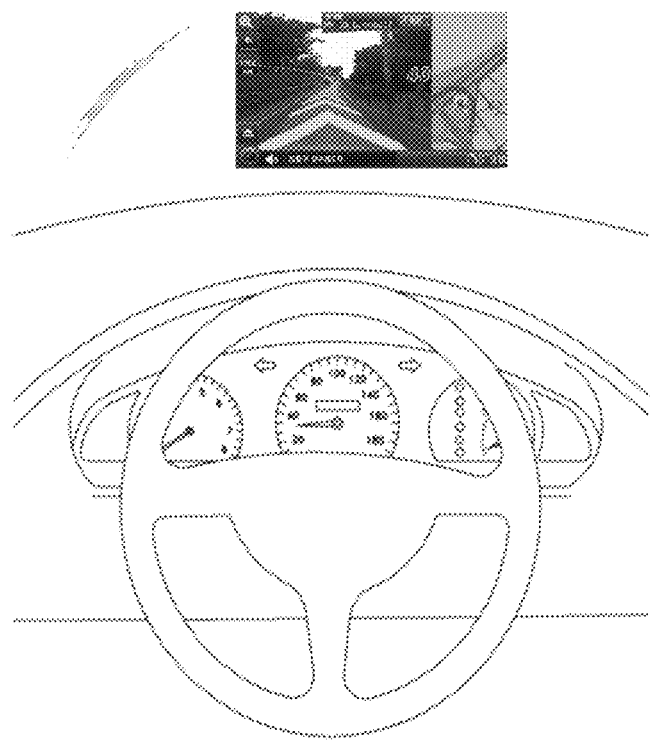
FIG. 14 is a view illustrating an implementation using a head-up display (HUD) according to an exemplary embodiment of the present invention.

FIG. 14 is a view illustrating an implementation using a head-up display (HUD) according to an exemplary embodiment of the present invention. Referring to FIG. 14, the HUD may display an augmented reality guidance screen thereon through wired/wireless communication with other devices.

As an example, the augmented reality may be provided through the HUD using a front glass of the vehicle, an image overlay using a separate image output apparatus, or the like, and the augmented reality providing unit 160 may generate an interface image overlaid on the augmented reality image or the glass as described above, or the like. Through this, an augmented reality navigation apparatus, a vehicle infotainment system, or the like, may be implemented.

According to various exemplary embodiments of the present invention described above, the virtual height on the virtual 3D space is determined so as to correspond to the height difference of the actual terrain on which the vehicle is to be driven, thereby making it possible to express the virtual information object at an optimal position, and a calculating process is also very simple, thereby making it possible to perform real time processing in an embedded environment.

In addition, according to various exemplary embodiments of the present invention described above, the virtual guidance object is dynamically expressed by an augmented reality method, thereby making it possible to provide effective guidance to the driver, cause an interest of the driver, and promote safe driving and convenience of the driver for the vehicle.

Meanwhile, the control methods according to various exemplary embodiments of the present invention described above may be implemented as programs and be provided to servers or devices. Therefore, the respective apparatuses may access the servers or the devices in which the programs are stored to download the programs.

In addition, the control method according to various exemplary embodiments of the present invention described above may be implemented as programs and be provided in a state in which it is stored in various non-transitory computer-readable media. The non-transitory computer-readable medium is not a medium that stores data therein for a while, such as a register, a cache, a memory, or the like, but means a medium that semi-permanently stores data therein and is readable by a device. In detail, various applications or programs described above may be stored and provided in the non-transitory computer-readable medium such as a compact disk (CD), a digital versatile disk (DVD), a hard disk, a Blu-ray disk, a universal serial bus (USB), a memory card, a read only memory (ROM), or the like.

Although exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

What is claimed is:

1. A control method of an electronic apparatus, wherein the apparatus includes a processor, the method comprising:
   determining a current position of a moving body;
   determining, by the processor, a terrain height in a region positioned within a predetermined distance from the current position of the moving body;
   calculating, by the processor, a terrain height difference by comparing the terrain height at the current position of the moving body with the terrain height at the region;
   generating, by the processor, an information object including guidance information of the moving body; and
   displaying, by the processor, the generated information object through augmented reality by using the terrain height difference and an optical axis of a camera installed in the moving body,
   wherein the displaying of the generated information object includes determining a mapping position of the information object on a virtual three-dimensional (3D) space for a photographed image of the camera using the terrain height difference.

2. The control method of the electronic apparatus of claim 1, further comprising calculating a vertical rotation angle of the camera based on the optical axis of the camera,
   wherein the displaying of the generated information object further includes correcting the determined mapping position of the information object using the calculated vertical rotation angle.

3. The control method of the electronic apparatus of claim 2, wherein the displaying of the generated information object includes:
   performing calibration on the camera to calculate camera parameters;
   generating the virtual 3D space for the photographed image of the camera on a basis of the camera parameters; and
   mapping the generated information object to the virtual 3D space on a basis of the mapping position of the information object depending on the correction.

4. The control method of the electronic apparatus of claim 3, wherein the displaying of the generated information object includes:
   converting the virtual 3D space to which the information object is mapped into a two-dimensional (2D) image on a basis of the camera parameters to generate an augmented reality screen; and
   displaying the generated augmented reality screen.

5. The control method of the electronic apparatus of claim 1, wherein in the determining of the terrain height, a terrain height of a route positioned within a predetermined distance from the current position of the moving body in an entire route up to a destination is determined in a case in which the electronic apparatus performs guidance of the route up to the destination.

6. The control method of the electronic apparatus of claim 1, wherein the information object includes a route guidance object for guiding a route up to a destination, and
in the displaying of the generated information object, the route guidance object is positioned and displayed on a road region of the augmented reality screen.

7. An electronic apparatus comprising:
a display unit displaying a screen; and
a control device configured to:
determine a terrain height in a region positioned within a predetermined distance from a current position of a moving body that is being operated,
calculate a terrain height difference by comparing the terrain height at the current position of the moving body with the terrain height at the region, and
generate an information object including information of the moving body, and
control the display unit to display the generated information object through augmented reality by using the terrain height difference and an optical axis of a camera installed in the moving body,
wherein the control device determines a mapping position of the information object on a virtual three-dimensional (3D) space for a photographed image of the camera using the terrain height difference.

8. The electronic apparatus of claim 7, wherein the control device is further configured to calculate a vertical rotation angle of the camera based on the optical axis of the camera, and correct the determined mapping position of the information object using the calculated vertical rotation angle.

9. The electronic apparatus of claim 8, wherein the control device is further configured to:
perform calibration on the camera to calculate camera parameters;
generate the virtual 3D space for the photographed image of the camera on a basis of the camera parameters; and
map the generated information object to the virtual 3D space on a basis of the mapping position of the information object depending on the correction.

10. The electronic apparatus of claim 9, wherein the control device converts the virtual 3D space to which the information object is mapped into a two-dimensional (2D) image on a basis of the camera parameters to generate an augmented reality screen, and controls the display unit to display the generated augmented reality screen.

11. The electronic apparatus of claim 7, wherein the control device determines a terrain height of a route positioned within a predetermined distance from the current position of the moving body in an entire route up to a destination in a case in which the electronic apparatus performs guidance of the route up to the destination.

12. The electronic apparatus of claim 7, wherein the information object includes a route guidance object for guiding a route up to a destination, and
the display unit positions and displays the route guidance object on a road region of an augmented reality screen.

13. A non-transitory computer readable storage medium containing instructions, that when executed by one or more processors, cause the one or more processor to perform a method, the method comprising:
determining a current position of a moving body;
determining a terrain height in a region positioned within a predetermined distance from the current position of the moving body;
calculating a terrain height difference by comparing the terrain height at the current position of the moving body with the terrain height at the region;
generating an information object including guidance information of the moving body; and
displaying the generated information object through augmented reality by using the terrain height difference and an optical axis of a camera installed in the moving body,
wherein the displaying of the generated information object includes determining a mapping position of the information object on a virtual three-dimensional (3D) space for a photographed image of the camera using the terrain height difference.

* * * * *